United States Patent

Jenny

[15] 3,704,843
[45] Dec. 5, 1972

[54] AIRCRAFT CONTROL SYSTEM
[72] Inventor: Robert B. Jenny, Kirkwood, Mo.
[73] Assignee: McDonnell Douglas Corporation, St. Louis, Mo.
[22] Filed: June 11, 1970
[21] Appl. No.: 45,428

[52] U.S. Cl. ................................................. 244/85
[51] Int. Cl. ............................................... B64c 13/04
[58] Field of Search ........................ 244/85, 90, 90 B

[56] References Cited

UNITED STATES PATENTS

| 2,596,242 | 5/1952 | Hill | 244/85 X |
| 2,753,134 | 7/1956 | Gordon et al. | 244/85 |
| 2,613,890 | 10/1952 | Beman | 244/85 |
| 3,478,990 | 11/1969 | Kaniuka | 244/85 |
| 3,236,478 | 2/1966 | Adams et al. | 244/77 D |

Primary Examiner—Milton Buchler
Assistant Examiner—Carl A. Rutledge
Attorney—Gravely, Lieder & Woodruff

[57] ABSTRACT

A control system for operating the longitudinal control surface of an aircraft in response to movement of the control stick in the cockpit. The control system includes a variable ratio linkage arrangement connected between the stick and the power actuator which moves the control surface. The ratio of the linkage arrangement is varied by a fluid operated motor, and when that ratio is varied in the presence of a load factor on the aircraft the control surface also moves. An accelerometer and regulator spring are mounted in opposition to one another and are connected to a control valve which directs fluid to the motor for changing the linkage ratio. The regulator spring is also connected with the linkage arrangement so that the force exerted by it on the accelerometer varies with the stick position. When the spring and accelerometer are balanced the control valve remains closed. However, when one overcomes the other the valve opens and changes the linkage ratio along with the control surface position such that the resulting change in the normal acceleration of the aircraft tends to restore the accelerometer and regulator spring to a balanced condition. Accordingly a prescribed load factor is associated with every position of the stick, and the stick need not be adjusted when the speed and location of the center of gravity of the aircraft change. The control system also renders the control surface less sensitive to stick movement at higher speeds.

12 Claims, 2 Drawing Figures

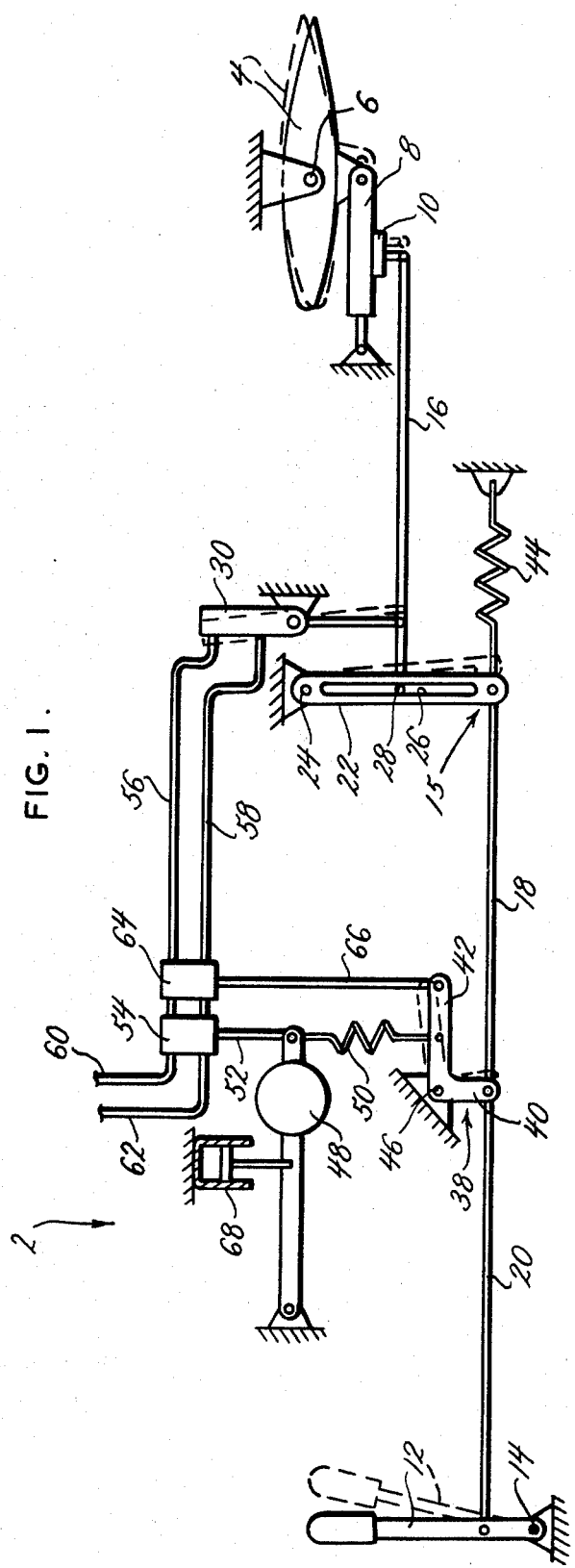
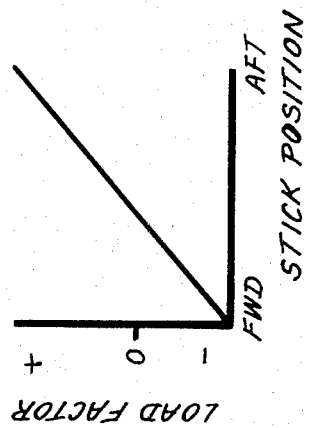

AIRCRAFT CONTROL SYSTEM

BACKGROUND OF THE INVENTION

This invention relates in general to aircraft and, more particularly, to a longitudinal control system for aircraft.

The stabilators or elevators of conventional high performance aircraft are normally moved by irreversible hydraulic actuators having control valves which are connected with the control stick located in the cockpit of the aircraft. Since the actuators are irreversible, the loads on the control surfaces are never transmitted to the stick. Indeed, the forces on the stick are wholly synthesized by springs connected with the stick, and these forces may be varied at the discretion of the pilot through a longitudinal trim control device. Normally, the pilot sets the longitudinal trim control so that no force is exerted on the stick by the so-called feel spring when the aircraft is flying in level flight, that is when the load factor is 1 (the resultant of the lifting forces on the aircraft equals 1g).

At high speeds the control surfaces become extremely powerful and relatively small deflections lead to substantial changes in load factor, whereas at low speeds such as those experienced during landing and take off the control surfaces must be deflected considerably more to achieve an equivalent variation in load factor. In other words, control of the aircraft is considerably more sensitive to movement of the stick at high speeds than at low speeds. By reason of this fact no direct relationship exists between the aircraft load factor and the stick position through the wide range of speeds available with such aircraft, and this in turn demands a high degree of skill on the part of the pilot. Indeed, the extreme sensitivity of the control surfaces at high speeds often causes pilots to overcorrect for slight changes in trim, and this leads to a condition of dynamic instability commonly called pilot induced oscillation.

Aside from the problems associated with the sensitivity of the control surfaces, conventional control systems do not compensate for changes in various flight conditions such as the air speed and the location of the center of gravity, and as a result pilots must continually retrim the aircraft when such flight conditions vary. For example, if the pilot increases the speed of the aircraft during horizontal flight, that is when the load factor is 1, the velocity of the airstream over the lifting surfaces increases and likewise so does the resultant lifting force on the aircraft. This causes the aircraft to rise (load factor increases), and in order to maintain level flight the pilot must push the stick forward a slight amount to increase the nose down moment.

SUMMARY OF THE INVENTION

One of the principal objects of the present invention is to provide a longitudinal control system for aircraft in which the stick deflection and stick force vary substantially in direct proportion to the normal load factor on the aircraft, irrespective of the air speed, altitude, or the location of the center of gravity for the aircraft. Another object is to provide a control system which automatically trims the aircraft when flight conditions, such as the air speed, center of gravity, and the like, vary. A further object is to provide a control system which is simple in construction, yet highly reliable in operation, and does not require external sensors or computers. An additional object is to provide a control system which needs no power source other than the hydraulic pressure used to operate the actuators for control surfaces anyway. These and other objects and advantages will become apparent hereinafter.

The present invention is embodied in an aircraft control system which moves the longitudinal control surfaces in response to movement of a manually operated member accessible to the pilot. The control system automatically maintains the aircraft at a substantially constant normal load factor for any selected position of the manually operable member. The invention also consists in the parts and in the arrangements and combinations of parts hereinafter described and claimed.

DESCRIPTION OF THE DRAWINGS

FIG. 1 is a schematic view of a control system constructed in accordance with and embodying the present invention (full lines indicate components at a zero load factor; dotted lines indicate components at a positive load factor);

FIG. 2 is a graph showing the variation of load factor relative to stick position.

DETAILED DESCRIPTION

Referring now in detail to the drawings, 2 designates a control system for an aircraft, and that system includes the usual stabilator 4 or control surface for varying the pitch or trim of the aircraft. The stabilator 4 pivots about a point 6 which is fixed relative to the aircraft. Thus, when the leading edge of the stabilator 4 is deflected downwardly the nose of the aircraft is pitched upwardly, and conversely when the leading edge is deflected upwardly the nose of the aircraft is pitched downwardly. Accordingly, movement of the stabilator 4 about the point 6 affords longitudinal or trim control over the aircraft. The angular disposition of the stabilator 4 is both maintained and altered by a trim actuator 8 which is an irreversible hydraulic jack having a trim control valve 10.

Located within the cockpit of the aircraft is the usual control stick 12 which pivots about a point 14 fixed relative to the aircraft. The control valve 10 on the actuator 8 and the control stick 12 are connected together by a variable ratio linkage arrangement 15 which in effect comprises three links 16, 18 and 20, and a variable ratio arm 22 which connects the links 16 and 18 and pivots about a point 24 fixed relative to the aircraft.

More specifically, the variable ratio arm 22 is provided with a longitudinally extending slot 26 which is normal to the link 16 when the aircraft has a zero load factor, but is inclined to the link 16 when the aircraft experiences a load factor. The slot receives a pin 28 to which one end of the link 16 is connected, the opposite end of the link 16 being connected to the trim control valve 10 of the actuator 8. The exact position of the pin 28 in the slot 26 is controlled by an hydraulic actuator 30 which is pivotally connected between the link 16 and a fixed portion of the aircraft.

The link 18 is pinned to the opposite or free end of the slotted link 22 and extends forwardly to a bell crank 38 having two arms 40 and 42. The link 18 is pinned to the arm 40 and similarly pinned to the arm 40 at the same point is the link 20 which extends forwardly therefrom. At its forward end the link 20 is pinned to the control stick 12 above the pivot point 14.

By means of the foregoing linkage arrangement 15 the link 16 moves with the links 18 and 20, as well as with the control stick 12, but for any movement of the links 18 and 20, the link 16 will move a lesser distance inasmuch as it is connected closer to the pivot point 24 than is the link 18. The variance in movement between the links 18 and 20, on one hand, and the link 16 on the other is dependent on just where the pin 28 is positioned in the slot 26. Thus, the movement of the stick 12 and links 18 and 20 is transferred to the link 16 through the slotted arm 24 at a ratio which is dependent on the location of the pin 28 in the slot 26.

Beyond the rear end of link 18 the slotted arm 22 is connected with a feel spring 44 which is a simple rate spring adjustable by the pilot through a conventional longitudinal trim control. The spring 44 is on the pilot or stick side of the linkage arrangement 15 so that the force exerted by it on the stick 12 is always equal for any given stick deflection. Moreover, the feel spring 44 for all intents and purposes supplies the only force exerted on the control stick 12 in opposition to the force exerted by the pilot inasmuch as the power actuator 8 is irreversible and does not transmit the aerodynamic forces acting on the stabilator 4 to the link 16. Since the feel spring 44 is a simple rate spring and operates on the pilot side of the slotted link 26, the force exerted by it varies in direct proportion with its own deflection and likewise in direct proportion to the deflection of the stick 12. Thus, by way of example, the force applied to the stick 12 by the pilot to move it one-half inch will be twice as much as that required to move it one-quarter inch.

The bell crank 38 at the juncture of its two arms 40 and 42 pivots about a point 46 which is fixed relative to the aircraft. The opposite arm 42 of that bell crank 38 is connected to an accelerometer 48 by means of a regulator spring 50. The accelerometer 48 is oriented to sense only substantially normal accelerations of the aircraft, that is to say accelerations which are substantially perpendicular to both the lateral and longitudinal axes of the aircraft. The regulator spring 50 on the other hand is positioned to resist the inertial forces exerted on the accelerometer due to normal accelerations of the aircraft, and the force so exerted is dependent on the position of the bell crank 38 which of course is moved by the stick 12 through the link 20.

The accelerometer 48 and regulator spring 50, are connected by means of a link 52 to a control valve 54 which directs pressurized hydraulic fluid through hydraulic lines 56 and 58 to the actuator 30 for controlling the disposition of the link 16 relative to the slotted arm 22. The control valve 54 receives fluid from the aircraft's hydraulic power source through a hydraulic supply line 60 and returns the fluid to the hydraulic power source through a hydraulic discharge line 62.

Interposed within the lines 56 and 58 is an inverter valve 64 which is connected to the arm 42 of the bell crank 38 by means of connecting link 66. The inverter valve 64 reverses the flow of hydraulic fluid through the lines 56 and 58 when the control stick 12 moves across its centered or zero load factor position, that is to say its position which corresponds to the normal position of the arm 22 as illustrated in full lines in FIG. 1.

Finally, the accelerometer 48 is connected with a damper 68 so that the accelerometer 48 and the system 2 are not affected by slight oscillations experienced by the aircraft in flight.

OPERATION

When the control stick 12 is at its centered or zero load factor position (full line position in FIG. 1), the variable ratio arm 22 will be generally perpendicular to the link 18 and the stabilator 4 will be set for zero lift so that the resultant of the lifting forces acting upon the aircraft will be neither positive nor negative, but zero. For this position of the slotted arm 22, the link 16 is approximately perpendicular thereto and slight movements of the link 16 relative to the arm 22 at the pin 28 will not result in any change in the deflection of the stabilator 4. Aircraft, however, are rarely operated at a load factor of zero which is in effect a weightless condition.

Normally, an aircraft is operated with positive load factors in which case the resultant of the lifting forces on the aircraft is directed upwardly in opposition to the force of gravity. In level flight this resultant equals 1g (load factor = 1). When the aircraft climbs the resultant exceeds 1g (load factor > 1) and in a normal descent the resultant is less than 1g (load factor < 1) but is still above zero g.

To maintain a positive load factor the control stick 12 is pulled aft of its center or zero load factor position (e.g., to the dotted line position), in which case the links 20 and 18 will be shifted rearwardly and will cause the arm 22 to pivot about its pivot point 24 to a position inclined relative to the link 16 (as illustrated in dotted lines). The arm 22 in turn will drive the link 16 rearwardly, causing it to operate the valve 10 on the trim actuator 8. The trim actuator 8 will move the stabilator 4 into a position suitable for sustaining a positive load factor. Most of the time this load factor will equal 1 which is the value required to maintain level flight.

Of course, when the control stick 12 is pulled rearwardly, the bell crank 38 rotates and its arm 42 pushes the link 66 upwardly (e.g., to the dotted line position) and sets the inverter valve 64 for flight in the positive load factor range.

Movement of the bell crank arm 42 also compresses the regulator spring 50, causing it to bear with greater force on the accelerometer 48 in comparison with the zero load factor position. On the other hand, the accelerometer 48 senses the positive load factor and is drawn downwardly in opposition to the compressive force exerted by the regular spring 50. When the force exerted by the regulator spring 50 balances the inertial force exerted on the accelerometer 48, the control valve 54 will remain closed and consequently the actuator 30 will have no affect on the link 16 or the position of the stabilator 40. Thus, for any given load factor there is only one position of the stick 12 which will compress the regulator spring 50 enough to balance the inertial force exerted on the accelerometer 48 at that load factor and maintain the control valve 54 in a closed position. Since the control stick 12 is connected with the regulator spring 50 through a simple linkage system and since the spring 50 is a simple rate spring, the deflection of the control stick 12 must vary in direct proportion with the load factor sensed by the accelerometer 48 to keep the spring 50 and accelerometer 48 balanced and the valve 54 in its closed position.

Assuming that the pilot while flying the aircraft at constant velocity and in level flight (load factor 1), desires to bring the aircraft to a higher elevation. To do so he must temporarily increase the load factor (increase it to perhaps 2), and this is accomplished by moving the control stick 12 to the position corresponding to the load factor selected for the ascent. The rearward movement of the stick 12 drives all of the links 20, 18 and 16 rearwardly, and thereby causes the actuator 8 to alter the deflection of the stabilator 4. Indeed, the stabilator 4 tips the nose of the aircraft upwardly and this in turn increases the normal acceleration of the aircraft (raises the load factor). The increased acceleration or load factor is sensed by the accelerometer 48 and it exerts a greater downward force on the regulator spring 50. However, contemporaneously, with the movement of the links 20 and 18 rearwardly, the bell crank arm 42 further compresses the regulator spring 50 so that the greater inertial force exerted by the accelerometer 48 is offset by the increased compressive force exerted by the spring 50.

During the transition from the lower load factor to the higher, the increased compressive force exerted by the spring 50 will perhaps lead the increase in normal acceleration sensed by the accelerometer 48. Should this occur, the accelerometer 48 will be temporarily driven upwardly and will open the control valve 54 which in turn will cause the actuator 30 to expand. The actuator 30 will drive the link 16 downwardly, causing its pin 28 to follow the inclined path of the slot 26. This, of course, drives the link 16 further rearwardly and causes the stabilator 4 to deflect even more. In time, however, the new load factor is reached and the forces exerted by the regulator spring 50 and accelerometer 48 balance, thereby bringing the control valve 54 to a closed position and the system 2 into equilibrium.

Indeed, for any given position of the control stick 12 the system 2 seeks a null position in which the valve 54 is closed and the normal acceleration or load factor matches the load factor associated with the stick position. For example, if the load factor falls below that commanded by a given stick position, the regulator spring 54 will overbalance the inertial force acting on the accelerometer 48 and open the control valve 54, causing the valve 54 to deliver more fluid to the actuator 30 and expand the same. As previously noted the expansion of the actuator 30 drives the link downwardly and since its pin 28 is confined in the inclined slot 26 of the arm 24 the entire link 16 shifts rearwardly and causes the actuator 8 to deflect the leading edge of the stabilator 4 downwardly. When this occurs, the aircraft is put into a climb and the normal acceleration increases until the forces exerted by the accelerometer 48 and spring 50 balance and the valve 54 closes. At this point the normal accelerator of the aircraft matches that commanded by the stick position.

On the other hand, if the normal acceleration of the aircraft results in a load factor greater than that commanded by the position of the stick 12, the inertial force exerted by the accelerometer 48 will overcome the regulator spring 50 and pull the link 52 downwardly. This again opens the valve 54, but sends the fluid through the lines 56 and 58 in the opposite direction, thereby causing the actuator to contract and lift the link 16 upwardly. Since the pin 28 at the leading end of the link 16 is confined in the inclined slot 26 of the arm 24, the entire link 16 will shift forwardly, causing the actuator 8 to deflect the leading edge of the stabilator 4 upwardly. This deflection of the stabilator 4 pitches the nose of the aircraft downwardly, and thereby decreases the normal acceleration. When the accelerometer 48 and regulator spring 50 again balance the load factor of the aircraft will match the load factor corresponding to the stick position, and at that point the control valve 54 will close, enabling the aircraft to maintain the scheduled load factor.

From the foregoing it is apparent that the system 2 always seeks a condition of equilibrium in which the control valve 54 is closed and the load factor matches the load factor corresponding to the particular position of the control stick 12. The tendency of the system 2 to find a null point is perhaps best illustrated by the graph of FIG. 2. In that graph the stick position represents the abscissa and the load factor the ordinate. The straight plotted line represents a condition wherein the valve 54 is closed. Thus, for every load factor there is a corresponding stick position and since the plot forms a straight line the stick position varies in direct proportion to the load factor. Should the load factor increase above the plotted line at any given stick position the valve 54 will open and the ratio of the linkage arrangement 15 will decrease with a corresponding movement of the link 16 forwardly. This causes the actuator 8 to deflect the leading edge of the stabilator 4 upwardly and thereby tip the nose of the aircraft downwardly. This in turn decreases the load factor and brings it back to the point of the plotted line corresponding to the specific stick position. Conversely, if the load factor falls below the plotted line at any given stick position, the valve 54 will open and increase the load factor until it again lies along the plotted line.

Several conditions will disrupt the load factor at any given stick position so as to cause the system 2 to react as previously described. Perhaps the most common is a change in the air speed.

When the air speed increases the velocity of the airstream over the lifting surfaces naturally increases, and this results in a greater lifting force or, in other words, an increase in load factor. The increased load factor is sensed by the accelerometer 48 and it opens the valve 54 and causes the actuator 30 to contract. This draws the pin 28 at the leading end of the link 16 upwardly in the slot 26, lowering the gear ratio of the linkage arrangement 15, and since the slot 26 is inclined the link 16 is also drawn forwardly. The forward movement of the link 16 causes the actuator 8 to deflect the leading edge of the stabilator 4 upwardly which of course tips the nose of the aircraft downwardly and thereby decreases the load factor. Conversely, when the air speed decreases so does the load factor. For the scheduled stick setting the spring 50 overcomes the accelerometer 48 and opens the valve 54, causing it to divert fluid to the actuator 30 and expand the same. This drives the link 16 downwardly and causes the linkage arrangement 15 to assume a higher gear ratio. It also causes the stabilator 4 to tip the nose of the aircraft upwardly and thereby increase the load factor so as to bring the system 2 back to the null position. Consequently, the pilot need not adjust the position of the control stick 12 each time he changes the throttle setting.

As previously noted changes in velocity of the aircraft are accompanied by changes in the ratio of the linkage arrangement 15 at the variable ratio arm 22. When the speed increases the ratio decreases, making the stabilator 4 less sensitive to movements of the control stick 12 which is desirable. This prevents the pilot from overcorrecting at high speeds and thereby effectively avoids a condition of dynamic instability called pilot induced oscillation. On the other hand, when the air speed decreases the ratio increases, and this provides better control over the aircraft at take off and landing speeds. Thus, the system 2 not only correlates stick position to load factor, but it also adjusts the sensitivity of the stabilator 4 to the speed of the aircraft.

Aside from changes in air speed, changes in the center of gravity for the aircraft will also disturb the load factor, and the system 2 similarly compensates for these changes without requiring an adjustment of the stick 12. Changes in the center of gravity occur quite often and are most noticeable when cargo or auxiliary fuel tanks are jettisoned.

The damper 68 prevents the accelerometer 48 from oscillating and consequently there is no degradation from the normal surface fixed aircraft dynamic stability should the aircraft encounter turbulent air or some other condition which might induce oscillations in the accelerometer 48.

From the foregoing it is apparent that the system 2 mechanically compares the position of the control stick 12 with the normal acceleration of the aircraft and indeed matches any control stick position with a load factor. The system 2 produces a stick deflection and stick force variation which is directly proportional to the variation of the aircraft normal load factor, even through large changes in air speed, altitude and center-of-gravity. The system 2 furthermore automatically retrims the stabilator 4 to compensate for trim changes resulting from changes in air speed, and center of gravity location. Finally, the system varies the ratio between the control stick 12 and stabilator 4, making the latter less sensitive to movement of the former at higher speeds. All of the foregoing advantages are achieved without employing any external sensors such as pivot-static tubes and without relying on computers. This make the system extremely simple and highly reliable.

This invention is intended to cover all changes and modifications of the example of the invention herein chosen for purposes of the disclosure which do not constitute departures from the spirit and scope of the invention.

What is claimed:

1. A control system for an aircraft having a movable control surface for varying the longitudinal attitude of the aircraft, said control system comprising: actuating means connected with the control surface to move the same upon command; a manually shiftable member operable by the pilot during flight and connected with the actuating means for commanding movement of the control surface in response to movement of the manually shiftable member; and controller means operably connected between the manually shiftable member and the actuating means and including an accelerometer for sensing normal accelerations of the aircraft and means for varying the ratio between the movement of the manually operable member and the movement of the control surface, the controller means commanding movement of the control surface in response to normal accelerations sensed by the accelerometer and independently of the manually shiftable member such that the load factor for the aircraft remains substantially constant for any selected position of the manually shiftable member.

2. A control system according to claim 1 wherein the means for varying the ratio operates in response to the accelerometer and provides a decrease in the ratio as the speed of the aircraft increases whereby the control surface is less sensitive to movement of the manually shiftable member at higher speeds.

3. A control system for an aircraft having a movable control surface for varying the longitudinal attitude of the aircraft, said control system comprising: actuating means connected with the control surface to move the same upon command; a manually shiftable member operable by the pilot during flight and connected with the actuating means for commanding movement of the control surface in response to movement of the manually shiftable member; and controller means operably connected between the manually shiftable member and the actuating means, the controller means including: an accelerometer for sensing normal accelerations of the aircraft, an arm pivoted with respect to the aircraft at its one end and having a predetermined path thereon, a link having its one end operably confined to the path on the arm and its opposite end connected with the actuating means so that the control surface moves in response to movement of the link, the path being normally directed oblique to a line extending between the ends of the link, whereby the link will shift longitudinally when it shifts its position on the path and will thereby cause the actuating means to move the control surface, and motor means connected to the link for moving it relative to the path, the motor means being controlled by the accelerometer such that it moves the link to a position wherein it causes the aircraft to increase its load factor when the accelerometer experiences a load factor less than that prescribed by the selected position of the manually shiftable member and vice-versa, the controller means commanding movement of the control surface in response to normal accelerations sensed by the accelerometer and independently of the manually shiftable member such that the load factor for the aircraft remains substantially constant for any selected position of the manually shiftable member.

4. A control system according to claim 3 wherein the controller means further comprises linking means interconnecting the manually shiftable member and the arm for moving the arm in response to movement of the manually shiftable member, and a regulator spring for exerting a force on the accelerometer in opposition to the inertial force imparted thereto by gravity and by normal accelerations of the aircraft, the regulator spring being responsive to the position of the manually operable member such that the force exerted on the accelerometer thereby varies with the position of the manually shiftable member.

5. A control system according to claim 5 wherein the motor means for shifting the link relative to the path on the arm comprises a fluid operated actuator and a control valve for directing pressurized fluid to the actuator; and wherein the regulator spring and accelerometer are connected with the control valve and hold it closed when the load factor sensed by the accelerometer matches the load factor prescribed by the position of the manually shiftable member.

6. A control system according to claim 4 wherein the activating means is an irreversible power actuator whereby aerodynamic forces exerted on the control surface are not transferred to the link.

7. A control system according to claim 6 and further characterized by a feel spring for synthesizing forces on the manually shiftable member, the feel spring being a simple rate spring connected with the manually shiftable member so that the force exerted by it on the member varies substantially in direct proportion to the movement of the member.

8. A control system according to claim 4 wherein the controller means further comprises a damper connected with the accelerometer.

9. An aircraft control system linking the control surface which alters the trim of the aircraft and the manually operated member in the cockpit by which pilot exercises control over the control surface, said control system comprising a trim actuator connected to the control surface for moving the same, a variable ratio linkage arrangement connected between the manually operable member and the trim actuator and constructed such that changes in the ratio of the linkage arrangement under flying conditions in which the aircraft experiences a load factor cause the portion of the linkage arrangement connected to the trim actuator to shift and thereby change the position of the control surface, linkage actuator for varying the ratio of the linkage arrangement, a controller for controlling the linkage actuator, an accelerometer, a regulator spring, the accelerometer and regulator spring being connected with the controller for actuating the same and being mounted such that the forces exerted thereby act in opposition to one another, the regulator spring being further connected with the manually operable member so that the force exerted thereby on the accelerometer varies with the position of the manually operable member, the controller remaining in a non-actuating condition when the accelerometer and regulator spring are balanced against one another whereby the ratio of the linkage arrangement is not disturbed by the linkage actuator, the controller activating the linkage actuator when the inertial force exerted by the accelerometer overcomes the force exerted by the spring or vice-versa so as to cause the linkage actuator to adjust the ratio of the linkage and simultaneously shift the portion of the linkage connected with the trim actuator such that the trim actuator moves the control surface to a position which provides a normal acceleration oriented to restore the balance between the accelerometer and regulator spring and thereby deactivate the controller.

10. A control system for an aircraft having a movable control surface for varying the longitudinal attitude of the aircraft, said control system comprising: actuating means connected with the control surface to move the same upon command; a manually shiftable member operable by the pilot during flight and connected with the actuating means for commanding movement of the control surface in response to movement of the manually shiftable member; and controller means operably connected between the manually shiftable member and the actuating means for causing the actuating means to move the control surface independently of the manually shiftable member such that the load factor for the aircraft remains substantially constant for any selected position of the manually shiftable member, the controller means including an accelerometer for sensing normal accelerations of the aircraft and means for exerting a force on the accelerometer in opposition to the force exerted thereon by normal accelerations of the aircraft, the last-named means being responsive to the position of the manually shiftable member such that magnitude of the force exerted thereby on the accelerometer is dependent on and varies with the position of the manually shiftable member.

11. A control system according to claim 10 wherein the actuating means is an irreversible power actuator.

12. A control system for an aircraft having a movable control surface for varying the longitudinal attitude of the aircraft, said control system comprising: actuating means connected with the control surface to move the same upon command; a manually shiftable member operable by the pilot during flight and connected with the actuating means for commanding movement of the control surface in response to movement of the manually shiftable member; and controller means operably connected between the manually shiftable member and the actuating means, the controller means including an accelerometer for sensing normal accelerations of the aircraft and a regulator spring which exerts a force on the accelerometer in opposition to the inertial force exerted thereon by gravity and by normal accelerations of the aircraft, the force exerted on the accelerometer by the regulator spring normally varying with the position of the manually shiftable member, the controller means commanding movement of the control surface in response to normal accelerations sensed by the accelerometer and independently of the manually shiftable member such that the load factor for the aircraft remains substantially constant for any selected position of the manually shiftable member.

* * * * *

UNITED STATES PATENT OFFICE
CERTIFICATE OF CORRECTION

Patent No. 3,704,843  Dated Dec. 5, 1972

Inventor(s) Robert B. Jenny

It is certified that error appears in the above-identified patent and that said Letters Patent are hereby corrected as shown below:

Column 9, line 1, claim 5 depends on claim 4 instead of claim 5.

Column 4, line 60, "stabilator 40" should be "stabilator 4".

Signed and sealed this 10th day of July 1973.

(SEAL)
Attest:

EDWARD M. FLETCHER, JR.
Attesting Officer

RENE TEGTMEYER
Acting Commissioner of Patents